US010642498B2

United States Patent
Benisty et al.

(10) Patent No.: US 10,642,498 B2
(45) Date of Patent: May 5, 2020

(54) SYSTEM AND METHOD FOR FLEXIBLE MANAGEMENT OF RESOURCES IN AN NVME VIRTUALIZATION

(71) Applicant: Western Digital Technologies, Inc., San Jose, CA (US)

(72) Inventors: Shay Benisty, Be'er Sheva (IL); Rajesh Koul, San Jose, CA (US)

(73) Assignee: Western Digital Technologies, Inc., San Jose, CA (US)

(*) Notice: Subject to any disclaimer, the term of this patent is extended or adjusted under 35 U.S.C. 154(b) by 100 days.

(21) Appl. No.: 15/805,619

(22) Filed: Nov. 7, 2017

(65) Prior Publication Data
US 2019/0138209 A1     May 9, 2019

(51) Int. Cl.
*G06F 3/06* (2006.01)
*G06F 12/02* (2006.01)

(52) U.S. Cl.
CPC .............. *G06F 3/061* (2013.01); *G06F 3/064* (2013.01); *G06F 3/0605* (2013.01); *G06F 3/0655* (2013.01); *G06F 3/0656* (2013.01); *G06F 3/0659* (2013.01); *G06F 3/0688* (2013.01); *G06F 12/0238* (2013.01); *G06F 2212/202* (2013.01)

(58) Field of Classification Search
CPC ...... G06F 3/061; G06F 3/0655; G06F 3/0688; G06F 12/0238; G06F 2212/202
See application file for complete search history.

(56) References Cited

U.S. PATENT DOCUMENTS

2006/0161733 A1    7/2006  Beckett et al.
2012/0151472 A1    6/2012  Koch et al.
(Continued)

OTHER PUBLICATIONS

Janene Ellefson, SSD Product Market Manager—PCIe, Micron Technology, "NVM Express: Unlock Your Solid State Drives Potential", Flash Memory Summit 2013, Santa Clara, CA, 114 pages.
(Continued)

*Primary Examiner* — Reginald G Bragdon
*Assistant Examiner* — Edward Wang
(74) *Attorney, Agent, or Firm* — Brinks Gilson & Lione

(57) ABSTRACT

Systems and methods for flexible management of resources in a Non-Volatile Memory Express (NVMe) virtualization environment are disclosed. In NVMe virtualization, the host device operates in the virtual world and the memory device operates in the physical world. In order for the memory device to perform a host access request (which includes the virtual identification), the memory device transforms the virtual identification into a physical identification. Likewise, prior to the memory device sending a memory device access request to the host device, the memory device transforms the physical identification into the virtual identification. There may be multiple physical resources, such as submission queues/completion queues and interrupt vectors. Rather than having separate translation tables for the queues and the interrupt vectors, a single virtual translation table is used to perform the translation from the virtual identification to the queues and the interrupt vectors. In this way, the memory device may perform the virtual translation in a more simplified manner.

21 Claims, 18 Drawing Sheets

(56) References Cited

U.S. PATENT DOCUMENTS

| | | |
|---|---|---|
| 2014/0281040 A1 | 9/2014 | Liu |
| 2015/0127882 A1 | 5/2015 | Carlson et al. |
| 2015/0254088 A1 | 9/2015 | Chou et al. |
| 2016/0004438 A1 | 1/2016 | Moon et al. |
| 2016/0077740 A1 | 3/2016 | Hussain et al. |
| 2016/0085718 A1 | 3/2016 | Huang |
| 2016/0140041 A1 | 5/2016 | Niu et al. |
| 2016/0147442 A1 | 5/2016 | Baderdinni et al. |
| 2016/0188510 A1 | 6/2016 | Singh et al. |
| 2016/0267016 A1 | 9/2016 | Lee et al. |
| 2016/0292007 A1* | 10/2016 | Ding ............... G06F 9/5011 |
| 2016/0321012 A1 | 11/2016 | Clark et al. |
| 2017/0075629 A1 | 3/2017 | Manohar et al. |
| 2017/0075828 A1 | 3/2017 | Monji et al. |
| 2017/0123659 A1 | 5/2017 | Nam et al. |
| 2017/0177222 A1 | 6/2017 | Singh et al. |

OTHER PUBLICATIONS

Kevin Marks, Dell, Inc., "An NVM Express Tutorial", Flash Memory Summit 2013, Santa Clara, CA, 92 pages.

Electronic unpublished U.S. Appl. No. 15/148,409 entitled "Systems and Methods for Processing a Submission Queue" filed May 6, 2016, pending, 45 pages.

Specification and Drawings of U.S. Appl. No. 15/457,676 entitled "Storage System and Method for Thermal Throttling via Command Arbitration" filed Mar. 13, 2017; 32 pages.

\* cited by examiner

| Physical Host Queue ID | Virtual Function ID | Virtual Host Queue ID |
|---|---|---|
| 0 | 0 | 0 |
| 1 | 1 | 0 |
| 2 | 1 | 1 |
| 3 | 1 | 2 |
| 4 | 1 | 3 |
| 5 | 1 | 4 |
| 6 | 1 | 5 |
| 7 | 0 | 1 |

Prior Art

FIG. 6B

| Physical Interrupt Vector ID | Virtual Function ID | Virtual Interrupt Vector ID |
|---|---|---|
| 0 | 0 | 0 |
| 1 | 1 | 0 |
| 2 | 1 | 1 |
| 3 | 0 | 1 |
| 4 | Not used | Not used |
| 5 | Not used | Not used |
| 6 | Not used | Not used |
| 7 | Not used | Not used |

Prior Art

FIG. 6C

| Physical Resource ID (9 bits) | Virtual Function ID (7 bits) | Virtual Resource ID (9 bits) |
|---|---|---|
| 0 | Configuration | Configuration |
| ...... | ...... | ...... |
| ...... | Configuration | Configuration |
| ...... | ...... | ...... |
| 511 | Configuration | Configuration |

SYSTEM AND METHOD FOR FLEXIBLE MANAGEMENT OF RESOURCES IN AN NVME VIRTUALIZATION

BACKGROUND

Non-Volatile Memory Express (NVMe) is a standard for accessing non-volatile storage media attached via PCI Express (PCIe) bus. NVMe may be used with a variety of non-volatile storage media, such as solid state drives (SSDs). Part of the NVMe standard includes an NVMe virtualization environment. Virtualization environments may use an NVM subsystem with multiple controllers to provide virtual or physical hosts direct I/O access.

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements.

FIG. 6B is an example of the first table (shown in FIG. 6A) directed to host queues.

FIG. 6C is an example of the second table (shown in FIG. 6A) directed to interrupt vectors.

FIG. 7B is a first example of the table (shown in FIG. 7A) directed to assigning physical resources.

DETAILED DESCRIPTION OF EMBODIMENTS

Overview

Figure 3:
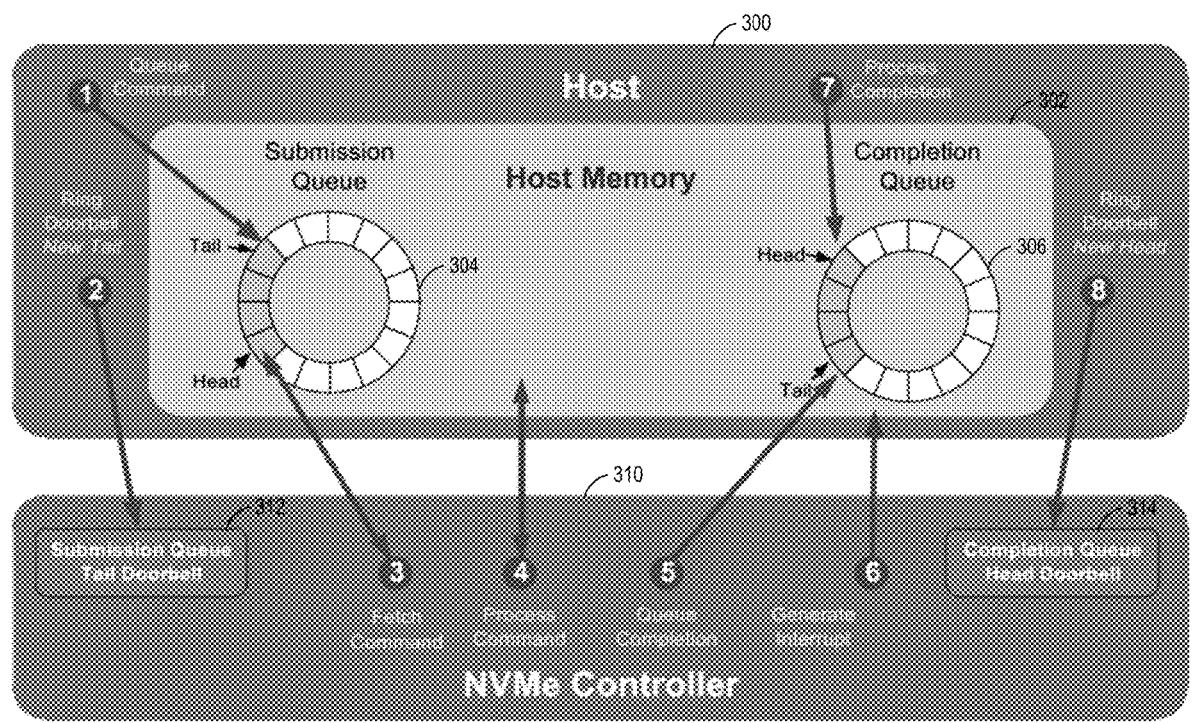
FIG. 3 is a block diagram of the host device and NVMe controller illustrating a sequence for a host device and a memory device to request and process an NVMe command.

The NVMe standard supports processing of commands via submission queues and completion queues, as discussed in more detail with regard to FIG. 3. In particular, the host places commands for execution in the submission queue. In response, the memory device executes the commands, and signifies the completion of the commands with entries on the completion queue. The memory device further notifies the host, via an interrupt, of the entries on the completion queue.

The NVMe standard further supports an NVMe virtualization environment. In such an implementation, the NVM subsystem within the NVMe virtualization environment may be composed of one or more primary controllers and one or more secondary controllers, where the secondary controllers depend on the one or more primary controllers for dynamically assigned resources. More specifically, the system may comprise a primary function (or master function) and a plurality (e.g., up to 128) virtual functions. The primary and virtual functions may be divided amongst a primary controller and secondary controller(s). Further, in one implementation, the primary and secondary controller(s) may be resident in a single device. Alternatively, the primary and secondary controller(s) may reside in multiple devices.

In practice, a host sends multiple commands in configuring the virtualization environment. For example, the host sends one command with regard to configuring the queues (e.g., the submission queues and completion queues) and a second command with regard to configuring the interrupts. For example, controller resources may be assigned or removed from a particular controller using the Virtualization Management command issued to a primary controller. The following types of controller resources may be defined: Virtual Queue Resource (a type of controller resource that manages one Submission Queue and one Completion Queue); Virtual Interrupt Resource (a type of controller resource that manages one interrupt vector). As discussed in more detail below, flexible (or shared) resources may comprise controller resources that may be assigned to the primary controller or one of its secondary controllers. The Virtualization Management command may be used to provision the Flexible Resources between a primary controller and one of its secondary controller(s). In one implementation, a primary controller's allocation of Flexible Resources may be modified using the Virtualization Management command and the change may take effect after a Controller Level Reset. A secondary controller may only support having Flexible Resources assigned or removed when it is in the offline state.

Figure 6A:
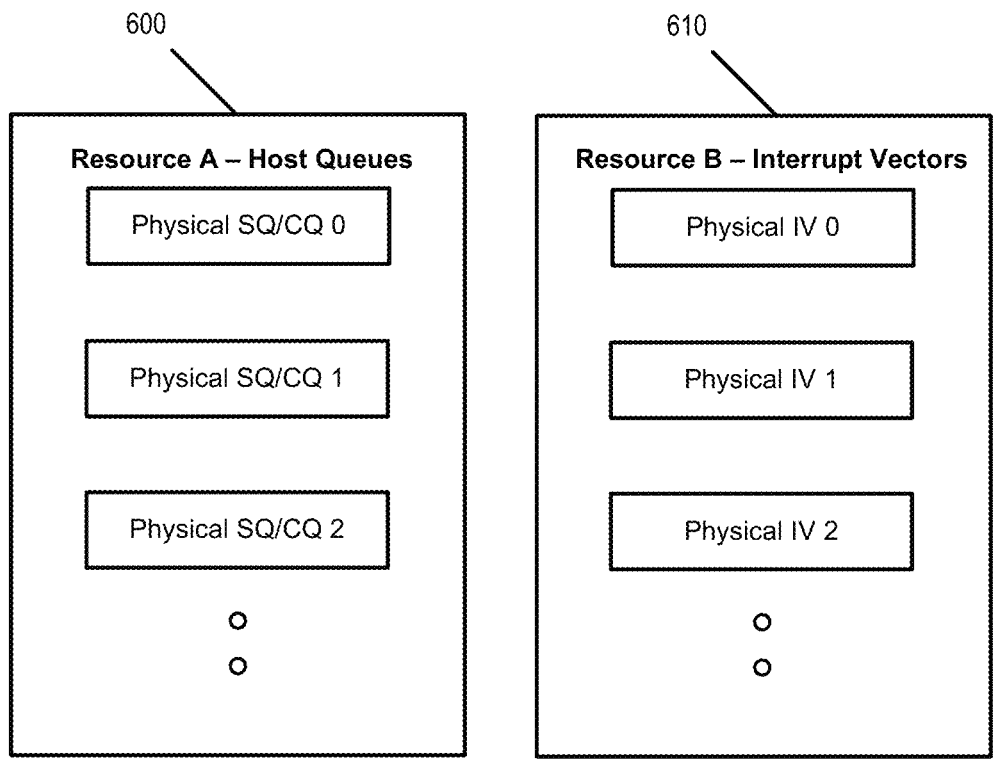
FIG. 6A illustrates two separate tables to assign physical resources, including a first table directed to host queues and a second table directed to interrupt vectors.

Responsive to receipt of the commands, the memory device configures separate tables as shown in FIG. 6A. In particular, the memory device populates a first table (Resource A—Host Queues) 600 with the correlation of the physical resources of the different queues (e.g., physical submission queue 0/completion queue 0; physical submission queue 1/completion queue 1; etc.) to the virtualized environment (including to the primary controller or secondary controller(s)). Likewise, the memory device populates a second table (Resource B—Interrupt Vectors) 610 with the correlation of the physical resources of the interrupt vectors (IV) (e.g., physical interrupt vectors 0; physical interrupt vectors 1; etc.) to the virtualized environment (including to the primary controller or secondary controller(s)). One type of interrupt vector is a message-signaled interrupt (MSI) type interrupt, such as an extended form of MSI (MSI-X). Types of interrupt vectors, other than MSI-X interrupt vectors, are contemplated.

Figure 6B:
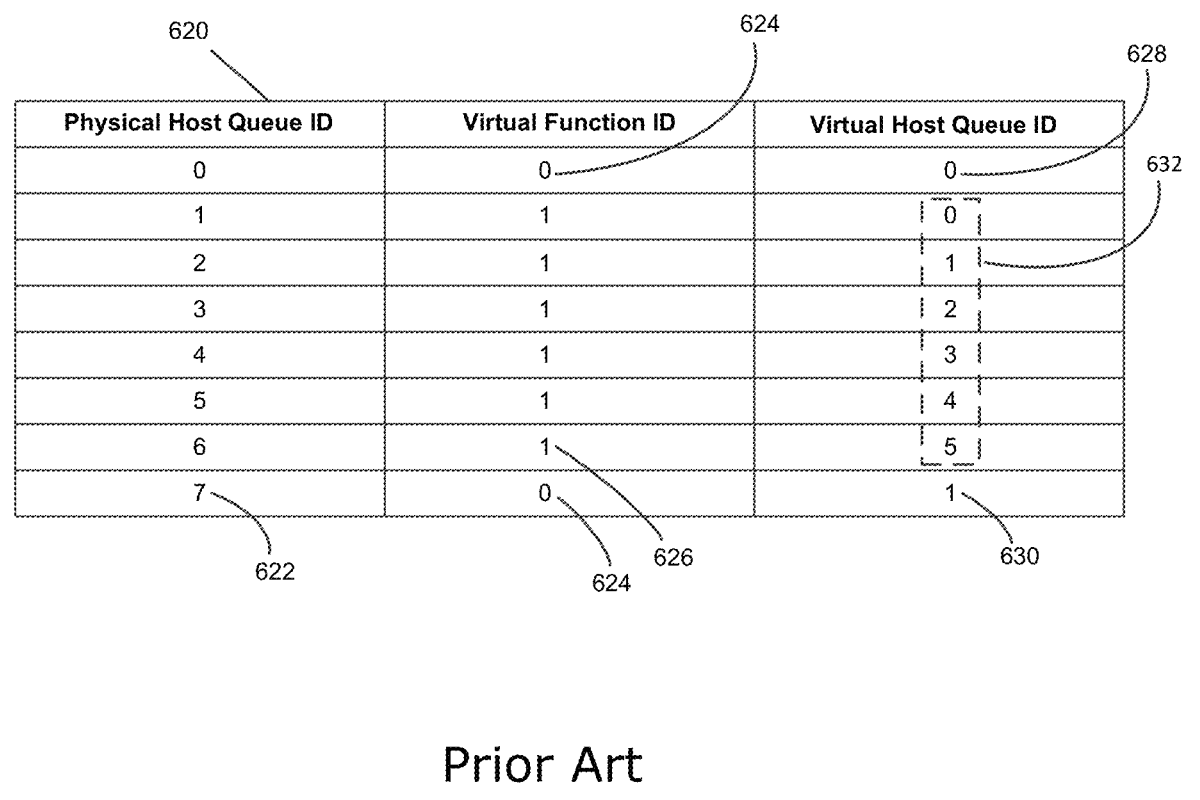

Examples of the two tables are illustrated in FIGS. 6B-C, with FIG. 6B comprising the physical host queue virtual translation table 620 and FIG. 6C comprising the physical interrupt vector virtual translation table 650. As shown in FIG. 6B, the physical host queue virtual translation table 620 includes a list of physical host queue identifications, such as host queue 0 (which includes submission queue 0 and completion queue 0), host queue 1 (which includes submission queue 1 and completion queue 1), etc. These physical host queues are mapped to the virtual world using two separate criteria, including the virtual function ID and the virtual host queue ID. In this regard, the virtual world may be represented by one or more virtual identifications (one example of which is the virtual function ID and the virtual host queue ID). In one implementation, the virtual function ID comprises the controller (such as the primary controller or one of the secondary controllers). As shown in FIG. 6B, the primary controller is assigned a value of "0" (as shown by element 624). Likewise, the secondary controller is assigned a value of "1" (as shown by element 626). Though only one secondary controller is shown, multiple secondary controllers are contemplated. Further, the virtual host queue ID is assigned in sequence for each virtual function ID. For example, the primary controller is assigned to physical host queue 0 and physical host queue 7. For each physical host queue, a virtual host queue ID is assigned. Thus, in the example illustrated, virtual host queue ID (shown as element 628) is assigned "0" as the first physical host queue assigned to the primary controller and virtual host queue ID (shown as element 630) is assigned "1" as the second physical host queue assigned to the primary controller. Likewise, the secondary controller is assigned to physical host queues 1-6, with the virtual host queue ID (shown as element 632) assigned in sequence from 0 to 5 for each of the respective physical host queue ID.

As shown in FIG. 6C, the physical interrupt vector virtual translation table 650 includes a list of physical interrupt vector identifications, such as interrupt vector 0, interrupt vector 1, etc. These interrupt vectors are mapped to the virtual world using two separate criteria, including the virtual function ID and the virtual interrupt vector ID. In one implementation, the virtual function ID comprises the controller (such as the primary controller or one of the secondary controllers). As shown in FIG. 6C, the primary controller is assigned a value of "0" (as shown by element 654). Likewise, the secondary controller is assigned a value of "1" (as shown by element 656). Further, the virtual interrupt vector ID is assigned in sequence for each virtual function ID. For example, the primary controller is assigned to physical interrupt vector 0 and physical interrupt vector 3. For each physical interrupt vector, a virtual interrupt vector ID is assigned. Thus, in the example illustrated, virtual interrupt vector ID (shown as element 658) is assigned "0" as the first physical interrupt vector assigned to the primary controller and virtual interrupt vector ID (shown as element 660) is assigned "1" as the second physical interrupt vector assigned to the primary controller. Likewise, the secondary controller is assigned to physical interrupt vector 1-2, with the virtual interrupt vector ID (shown as element 662) assigned in sequence from 0 to 1 for each of the respective physical interrupt vector ID. As shown in FIG. 6C, unassigned interrupt vectors (such as interrupt vectors 4-7) are illustrated in the table as being "not used". In this regard, absent a configuration command directed to a specific interrupt vector, the specific interrupt vector remains unassigned. Thus, the two-table implementation may complicate the translation process and increase the area of the ASIC resident on the memory device.

In one implementation, the virtual translation table correlates multiple physical resources into a single table. As one example, physical resources such as queues (e.g., submission queues and completion queues) and interrupt vectors may be correlated to virtual resources in the single table. In this regard, the single virtual translation table may include a first physical resource to a first type (such as to the queues) and a second physical resource to a second type (such as to the interrupt vectors). Thus, the single table correlates the queues (e.g., a first type of resource) and the interrupt vectors (e.g., a second type of resource), with the two types being different.

In order to populate and manage a single virtual translation table, one or more of the following assumptions regarding the physical resources are made:

(1) physically, the memory device supports the worst-case scenario whereby all submission queues, completion queues and MSI-X interrupt vectors are used. This worst-case scenario may occur when there is one-to-one mapping (e.g., an MSI-X vector is associated with a single completion queue, which is associated with a single submission queue). In this regard, the memory device allocates sufficient buffers for the MSI-X table assuming that each pair of submission and completion queues uses a unique MSI-X vector. The same assumption may apply to the maximum number of physical completion queues supported by the memory device.

(2) the number of used completion queues in each primary/secondary controller is not more than the number of used submission queues.

(3) the number of used interrupt vectors (e.g., MSI-X vectors) in each primary/secondary controller is not more than the number of used completion queues.

The three assumptions above comply with the NVMe standard. With regard to assumption (1), the memory device supports the worst case scenario defined in the NVMe standard. In this regard, the allocation complies with the storage allocation as outlined in the NVMe standard. With regard to assumption (2), having a used completion queue that is not assigned to any submission queue does not comply with the NVMe standard since the memory device will never post an entry to a completion queue that is not assigned to any submission queue. With regard to assumption (3), if the number of interrupt vectors is greater than the number of used completion queues, then there will be at least one interrupt vector that is not associated with any completion queue, and therefore not used in the system.

Figure 7A:
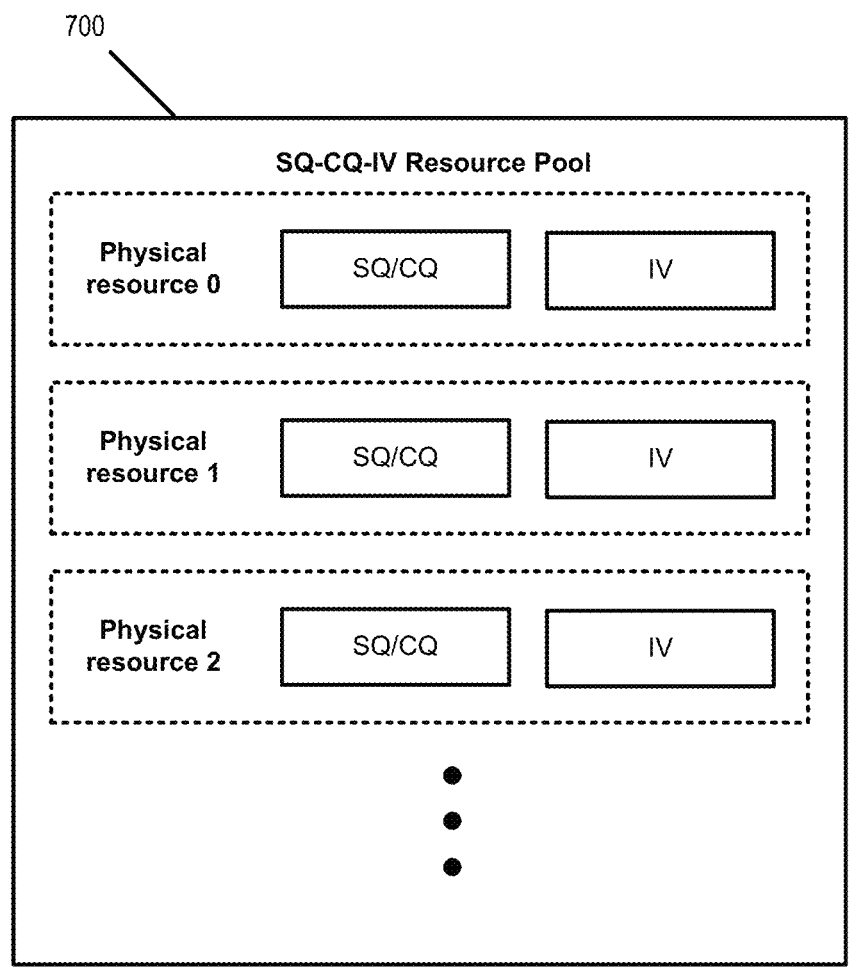
FIG. 7A illustrates a single table to assign physical resources, including assignments of the host queues and the interrupt vectors.

One example table 700 is illustrated in FIG. 7A. As shown, table 700 lists the physical resource pool, which includes submission queues (SQ), completion queues (CQ) and interrupt vectors (IV). Specifically, table 700 illustrates physical resource 0, which includes SQ0/CQ0 and IV0, physical resource 1, which includes SQ1/CQ1 and IV1, etc. Thus, FIG. 7A illustrates a single physical resource group, which contains a submission queue, completion queue and an MSI-X interrupt vector. This single resource group may simplify the virtual translation since the memory device may manage/perform the translation using only a single translation table.

Another example table 720 is illustrated in FIG. 7B. As shown, table 720 lists the physical resource identification, which may include multiple physical resources defined together. As one example, submission queue 0, completion queue 0, and interrupt vector 0 may be correlated to physical resource ID 0. As shown in FIG. 7B, there are 512 physical resource IDs that may be defined by 9 bits. Other numbers of physical resource IDs are contemplated. Further, table 720 illustrates the correlation of the physical resource IDs to the virtual world. In particular, two separate criteria, in the form of virtual function ID and virtual resource ID, may be used to define the virtual world. The virtual function ID may comprise the designation as to the primary or secondary controller, while the virtual resource ID may comprise the virtual resources that may be assigned to respective virtual function IDs. As shown in FIG. 7B, the virtual function ID comprises 7 bits, so that a total of 128 primary and secondary controllers may be assigned. Other numbers of secondary controllers are contemplated. Further, the virtual resource ID comprises 9 bits, so that a total of 512 virtual resources may be assigned. Thus, the memory device, in managing the table, may make certain assumptions, such as the maximum number of physical submission queues, completion queues and MSI-X interrupt vectors is 512 while the maximum number of primary and secondary controllers is 128. 16 bits are used for each physical host resource. 7 bits are used for the virtual function ID and 9 bits for the virtual resources ID. Likewise, other numbers of primary resources are contemplated.

As discussed in more detail below, in order to support the NVMe virtualization, the host operates in the virtual world (with virtual resources) while the memory device operates in the physical world (with physical resources). The table illustrated in FIG. 7B presents one example of a structure of the mapping table for this translation between the virtual world and the physical world. In the implementation illustrated in FIG. 7B, the memory device includes a firmware constraint in terms of queue allocation. Specifically, a triplet of physical submission queue (SQ), physical completion queue (CQ) and physical MSI-X vector is allocated to the same triplet virtual resource IDs. For instance, it is not allowed to allocate VFx VSQIDy to PSQIDn and VFx VCQIDy to PCQIDm while n≠m. However, PCQIDm may not be used when the host decides not to create it. The same constraint applies to MSI-X. This is an internal constraint to the memory device, which is not visible to the host and does not reduce the flexibility of mapping the resources. Thus, as illustrated in FIGS. 7A-B, there are various ways in which to correlate the physical resources to one another, and to the virtual world.

Figure 7C:
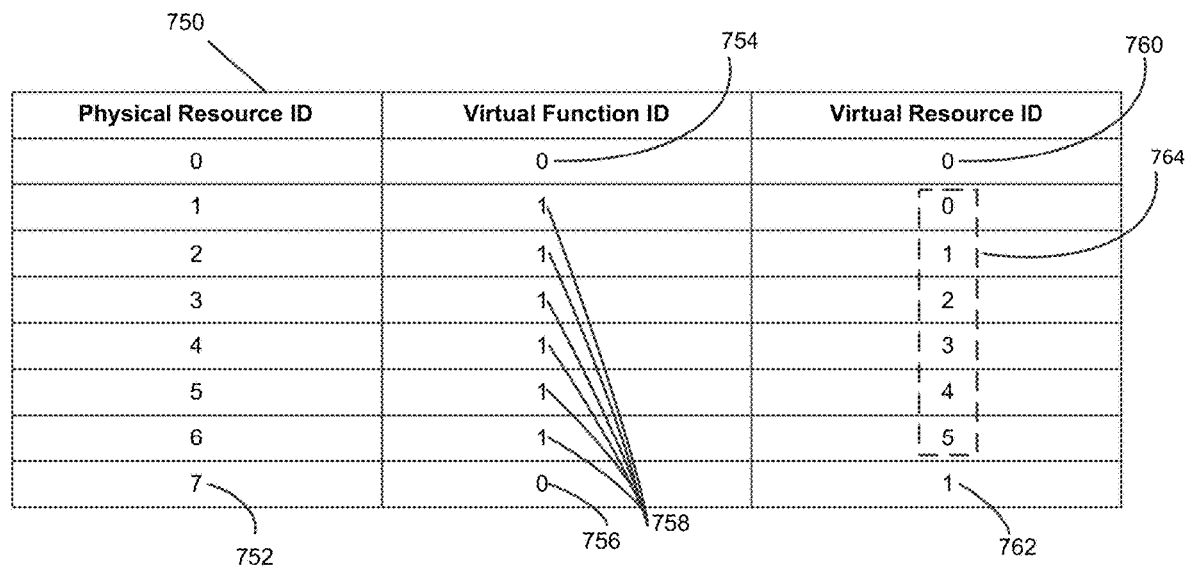
FIG. 7C is a second example of the table (shown in FIG. 7A) directed to assigning physical resources.

FIG. 7C illustrates a population of the table illustrated in FIG. 7B. Specifically, table 750 includes physical resource IDs (shown as element 752), which includes 8 separate physical resources. As discussed above, one example of physical resources includes submission queue/completion queue/interrupt vector. Other combinations of physical resources are contemplated. FIG. 7C further illustrates a primary controller (shown as element 754, 756) assigned to physical resource 0 and physical resource 7, with correlated virtual resource IDs 760 and 762. As discussed above, a resource may comprise a private resource (which is only assignable to the primary controller) and one or more flexible resources (which may be assignable either to a primary controller or a secondary controller). In the example shown in FIG. 7C, element 754 comprises a private resources (e.g., admin submission and completion queues/interrupt), and element 756 comprises an allocated flexible resource. In addition, FIG. 7C further illustrates a secondary controller (shown as element 758) assigned to physical resources 1-6, with correlated virtual resource IDs 764.

Figure 7D:
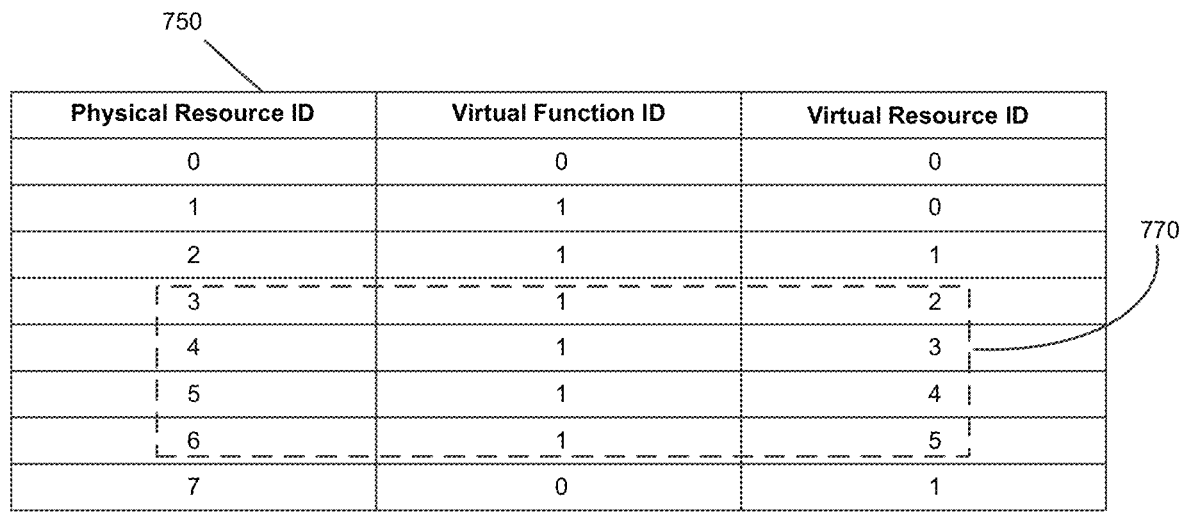
FIG. 7D is identical to FIG. 7C, highlighting the additional assignment of interrupt vectors.

Thus, as illustrated in FIG. 7C, each entry in the table includes a pair of submission and completion queues along with a single vector from the MSI-X table. Once a resource is allocated to a primary or secondary controller, it includes a submission queue, completion queue and an MSI-X vector. The memory device performs this allocation even when the host needs the submission queue only and not the completion queue and MSI-X vector. This is illustrated by comparing FIG. 6C with FIG. 7C. As shown in FIG. 6C, there are several entries where there is no allocation (shown as "not used"). In contrast, FIG. 7C assigns all of the MSI-X vectors, even though the host did not include the allocation in any configuration command. This is highlighted in FIG. 7D, which is identical to FIG. 7C, highlighting the additional assignment of interrupt vectors shown as element 770. Thus, in one implementation, it is not possible to allocate a pair of physical queues (submission queue/completion queue) to one virtual controller and the associated physical MSI-X interrupt vector to a different virtual controller. This constraint is acceptable given the above assumptions. Specifically, the constraint is acceptable given assumption (3), which states that the number of required MSI-X vectors is fewer than the number of used completion queues for a specific virtual controller. Specifically, one implementation may use the single allocation table disclosed herein while adding a single bit (or other type of indicator) to each entry in the table. This bit specifies whether the interrupt vector is allocated or not. This bit may be used in a system that expects to receive errors when accessing non-allocated resource (e.g., when the host accesses a non-allocated entry in MSI-X). In this implementation, this occurrence may not be considered as an error since the device might allocate it internally even when the host does not do so. In this regard, the single bit (or other type of indicator) may assist in this situation.

In practice, a host device access request may include one or more virtual identifications, such as a virtual function ID and a virtual resource ID. Based on the virtual translation table, the memory device may determine the specific physical resource ID correlated to the virtual function ID and a virtual resource ID in the host device access request. For example, the host device access request may include virtual function ID=0 and virtual resource ID=1. The memory device may determine that the specific physical resource ID=7, which is correlated to virtual function ID=0 and virtual resource ID=1, as shown in FIG. 7C. Similarly, the memory device may send a memory device access request communication for a specific physical resource. In order to generate the one or more virtual identifications, such as a virtual function ID and a virtual resource ID, the memory device may use the virtual translation table. Thus, for the specific physical resource ID=7 (which may relate to either submission queue 7/completion queue 7 or MSI-X 7), the memory device may include virtual function ID=0 and virtual resource ID=1 in the memory device access request communication.

In this regard, using the single resource pool in performing the virtual translation may improve the implementation of virtual translation by the memory device. As one example, using the single resource pool enables flexibility in the assignment. In particular, the methodology supports any assignment between the virtual resources to the internal physical resources. Further, using the single resource pool reduces the footprint in the memory resident in the memory device. In addition, the methodology may be performed quickly. In particular, in a few hardware cycles, the virtual mapping between the virtual and physical resources may be performed. This may be beneficial since in one implementation, all host accesses go through the PCIe bus, including NVMe registers, MSI-X and controller memory buffers (which implement data buffers and host queues). Finally, using the single resource pool is straightforward since all resource allocations are held in a single mapping table, simplifying implementation and debugging.

Embodiments

The following embodiments describe non-volatile memory devices and related methods for processing of commands. Before turning to these and other embodiments, the following paragraphs provide a discussion of exemplary non-volatile memory devices and storage modules that can be used with these embodiments. Of course, these are just examples, and other suitable types of non-volatile memory devices and/or storage modules can be used.

Figure 1A:
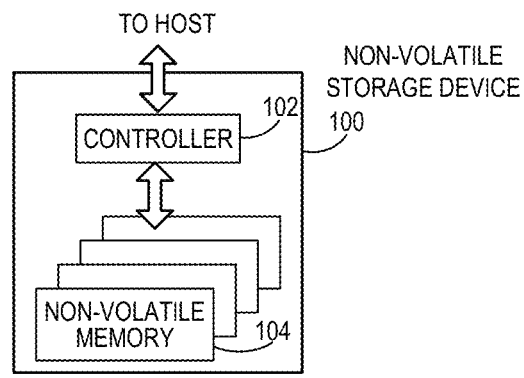
FIG. 1A is a block diagram of an exemplary non-volatile memory system.

FIG. 1A is a block diagram illustrating a non-volatile memory device 100. The non-volatile memory device 100 may include a controller 102 and non-volatile memory that may be made up of one or more non-volatile memory dies 104. As used herein, the term die refers to the set of non-volatile memory cells, and associated circuitry for managing the physical operation of those non-volatile memory cells, that are formed on a single semiconductor substrate. The controller 102 may interface with a host device or a host system via a communication interface and transmit command sequences for read, program, and erase operations to the non-volatile memory die(s) 104. As discussed below, the commands may include logical and/or physical addresses.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. One example of the firmware is a flash translation layer. In operation, when a host device needs to read data from or write data to the flash memory, it will communicate with the flash memory controller. In one embodiment, if the host device provides a logical address to which data is to be read/written, the flash memory controller can convert the logical address received from the host to a physical address in the flash memory. The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The interface between the controller 102 and the non-volatile memory die(s) 104 may be any suitable flash interface, such as Toggle Mode 200, 400, or 800. In one embodiment, the memory device 100 may be a card based system, such as a secure digital (SD) or a micro secure digital (micro-SD) card. In an alternate embodiment, the non-volatile memory device 100 may be part of an embedded memory device.

Although in the example illustrated in FIG. 1A, the non-volatile memory device 100 may include a single channel between the controller 102 and the non-volatile memory die(s) 104, the subject matter described herein is not limited to having a single memory channel. For example, in some NAND memory device architectures, 2, 4, 8 or more NAND channels may exist between the controller and the NAND memory die(s) 104, depending on controller capabilities. In any of the embodiments described herein, more than a single channel may exist between the controller and the memory die(s) 104, even if a single channel is shown in the drawings.

Figure 1B:
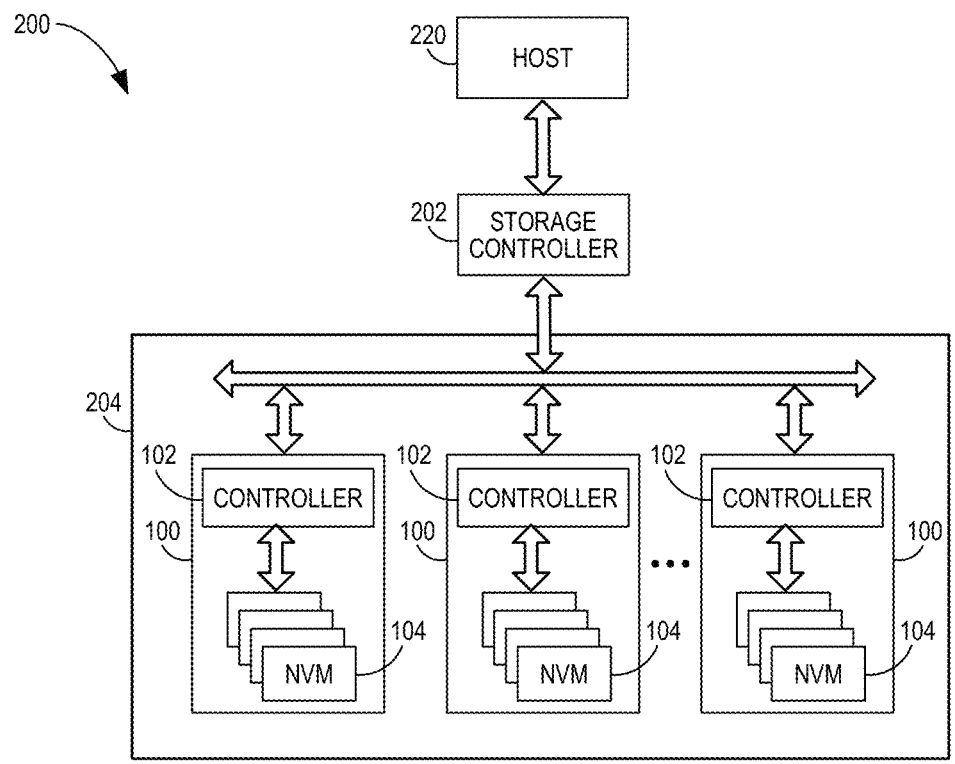
FIG. 1B is a block diagram of a storage module that includes a plurality of non-volatile memory systems and a host.

FIG. 1B illustrates a storage module 200 that includes plural non-volatile memory devices 100. As such, the storage module 200 may include a storage controller 202 that interfaces with a host 220 and with a storage system 204, which includes a plurality of non-volatile memory devices 100. The interface between the storage controller 202 and non-volatile memory devices 100 may be a bus interface, such as a serial advanced technology attachment (SATA), a peripheral component interface express (PCIe) interface, an embedded MultiMediaCard (eMMC) interface, a SD interface, a Universal Serial Bus (USB) interface, or a fabric transport interface, as examples. The storage system 200, in one embodiment, may be a solid state drive (SSD), such as found in portable computing devices, such as laptop computers and tablet computers, and mobile phones.

Figure 1C:
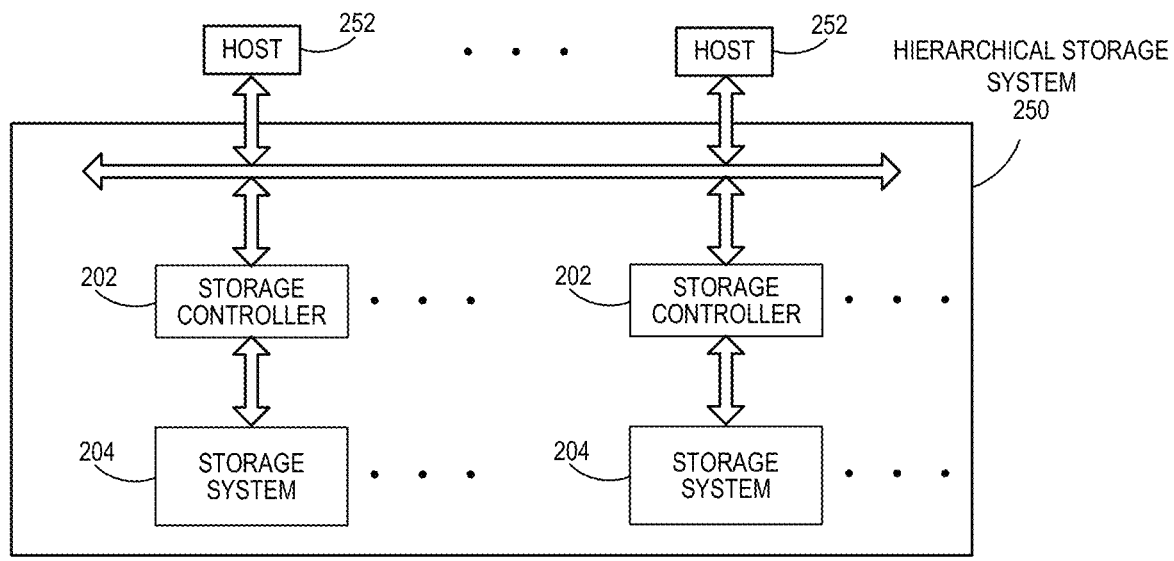
FIG. 1C is a block diagram of a hierarchical storage system.

FIG. 1C is a block diagram illustrating a hierarchical storage system 250. The hierarchical storage system 250 may include a plurality of storage controllers 202, each of which control a respective storage system 204. Host systems 252 may access memories within the hierarchical storage system 250 via a bus interface. Example bus interfaces may include a non-volatile memory express (NVMe), a fiber channel over Ethernet (FCoE) interface, an SD interface, a USB interface, a SATA interface, a PCIe interface, or an eMMC interface as examples. In one embodiment, the hierarchical storage system 250 illustrated in FIG. 1C may be a rack mountable mass storage system that is accessible by multiple host computers, such as would be found in a data center or other location where mass storage is needed. In one embodiment, host systems 252 may include the functionality described in host 220.

Figure 2A:
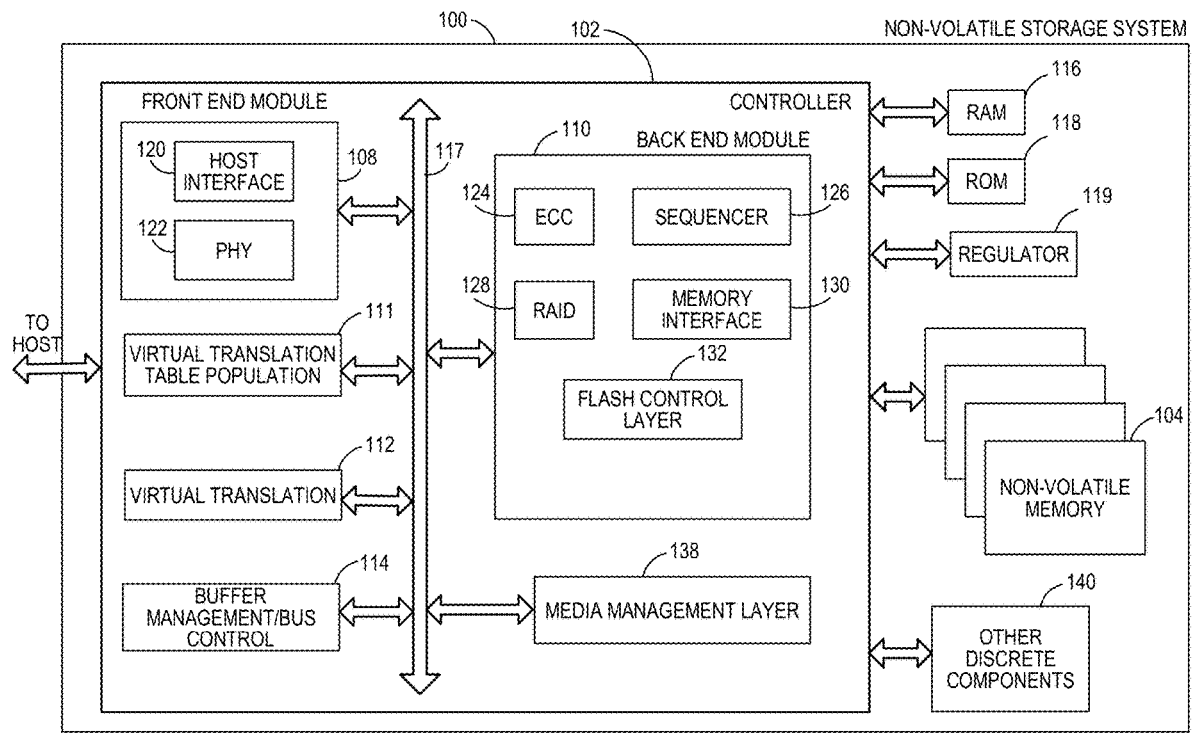
FIG. 2A is a block diagram of exemplary components of a controller of the non-volatile memory system of FIG. 1A.

FIG. 2A is a block diagram illustrating exemplary components of the controller 102 in more detail. The controller 102 may include a front end module 108 that interfaces with a host, a back end module 110 that interfaces with the non-volatile memory die(s) 104, and various other modules that perform various functions of the non-volatile memory device 100. In general, a module may be hardware or a combination of hardware and software. For example, each module may include an application specific integrated circuit (ASIC), a field programmable gate array (FPGA), a circuit, a digital logic circuit, an analog circuit, a combination of discrete circuits, gates, or any other type of hardware or combination thereof. In addition or alternatively, each module may include memory hardware that comprises instructions executable with a processor or processor circuitry to implement one or more of the features of the module. When any one of the module includes the portion of the memory that comprises instructions executable with the processor, the module may or may not include the processor. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 102 may include a buffer manager/bus control module 114 that manages buffers in random access memory (RAM) 116 and controls the internal bus arbitration for communication on an internal communications bus 117 of the controller 102. A read only memory (ROM) 118 may store and/or access system boot code. Although illustrated in FIG. 2A as located separately from the controller 102, in other embodiments one or both of the RAM 116 and the ROM 118 may be located within the controller 102. In yet other embodiments, portions of RAM 116 and ROM 118 may be located both within the controller 102 and outside the controller 102. Further, in some implementations, the controller 102, the RAM 116, and the ROM 118 may be located on separate semiconductor dies. As discussed below, in one implementation, the submission queues and the completion queues may be stored in the Controller Memory Buffer, which may be housed in RAM 116.

Additionally, the front end module 108 may include a host interface 120 and a physical layer interface (PHY) 122 that provide the electrical interface with the host or next level storage controller. The choice of the type of the host interface 120 can depend on the type of memory being used. Examples types of the host interface 120 may include, but are not limited to, SATA, SATA Express, SAS, Fibre Channel, USB, PCIe, and NVMe. The host interface 120 may typically facilitate transfer for data, control signals, and timing signals.

The back end module 110 may include an error correction controller (ECC) engine 124 that encodes the data bytes received from the host, and decodes and error corrects the data bytes read from the non-volatile memory die(s) 104. As discussed in more detail below, the ECC engine may be tunable, such as to generate different amounts of ECC data based on the mode (e.g., generate normal mode ECC data in normal programming mode and generate burst mode ECC data in burst programming mode, with the burst mode ECC data being greater than the normal mode ECC data). The back end module 110 may also include a command sequencer 126 that generates command sequences, such as program, read, and erase command sequences, to be transmitted to the non-volatile memory die(s) 104. Additionally, the back end module 110 may include a RAID (Redundant Array of Independent Drives) module 128 that manages generation of RAID parity and recovery of failed data. The RAID parity may be used as an additional level of integrity protection for the data being written into the non-volatile memory device 100. In some cases, the RAID module 128 may be a part of the ECC engine 124. A memory interface 130 provides the command sequences to the non-volatile memory die(s) 104 and receives status information from the non-volatile memory die(s) 104. Along with the command sequences and status information, data to be programmed into and read from the non-volatile memory die(s) 104 may be communicated through the memory interface 130. In one embodiment, the memory interface 130 may be a double data rate (DDR) interface, such as a Toggle Mode 200, 400, or 800 interface. A flash control layer 132 may control the overall operation of back end module 110.

Thus, the controller 102 may include one or more management tables for managing operations of storage system 100. One type of management table includes logical-to-physical address mapping table. The size of logical-to-physical address mapping table may grow with memory size. In this regard, the logical-to-physical address mapping table for high capacity storage device (e.g., greater than 32G) may be too large to store in SRAM, are may be stored in non-volatile memory 104 along with user and host data. Therefore, accesses to non-volatile memory 104 may first require reading the logical-to-physical address mapping table from non-volatile memory 104.

Additional modules of the non-volatile memory device 100 illustrated in FIG. 2A may include a media management layer 138, which performs wear leveling of memory cells of the non-volatile memory die 104. The non-volatile memory device 100 may also include other discrete components 140, such as external electrical interfaces, external RAM, resistors, capacitors, or other components that may interface with controller 102. In alternative embodiments, one or more of the RAID module 128, media management layer 138 and buffer management/bus controller 114 are optional components that may not be necessary in the controller 102.

Other modules of the non-volatile memory device 100 illustrated in FIG. 2A may include virtual translation table population 111 and virtual translation 113. As discussed in more detail below, the memory device may receive one or more commands regarding the configuration of the virtualization environment. The memory device may use virtual translation table population 111 in order to populate the virtual translation table. Further, the memory device may use virtual translation 113 in order to perform the translation from the virtual world to the physical world and vice-versa. In operation, virtual translation 113 may use the virtual translation table to perform the various translations.

Figure 2B:
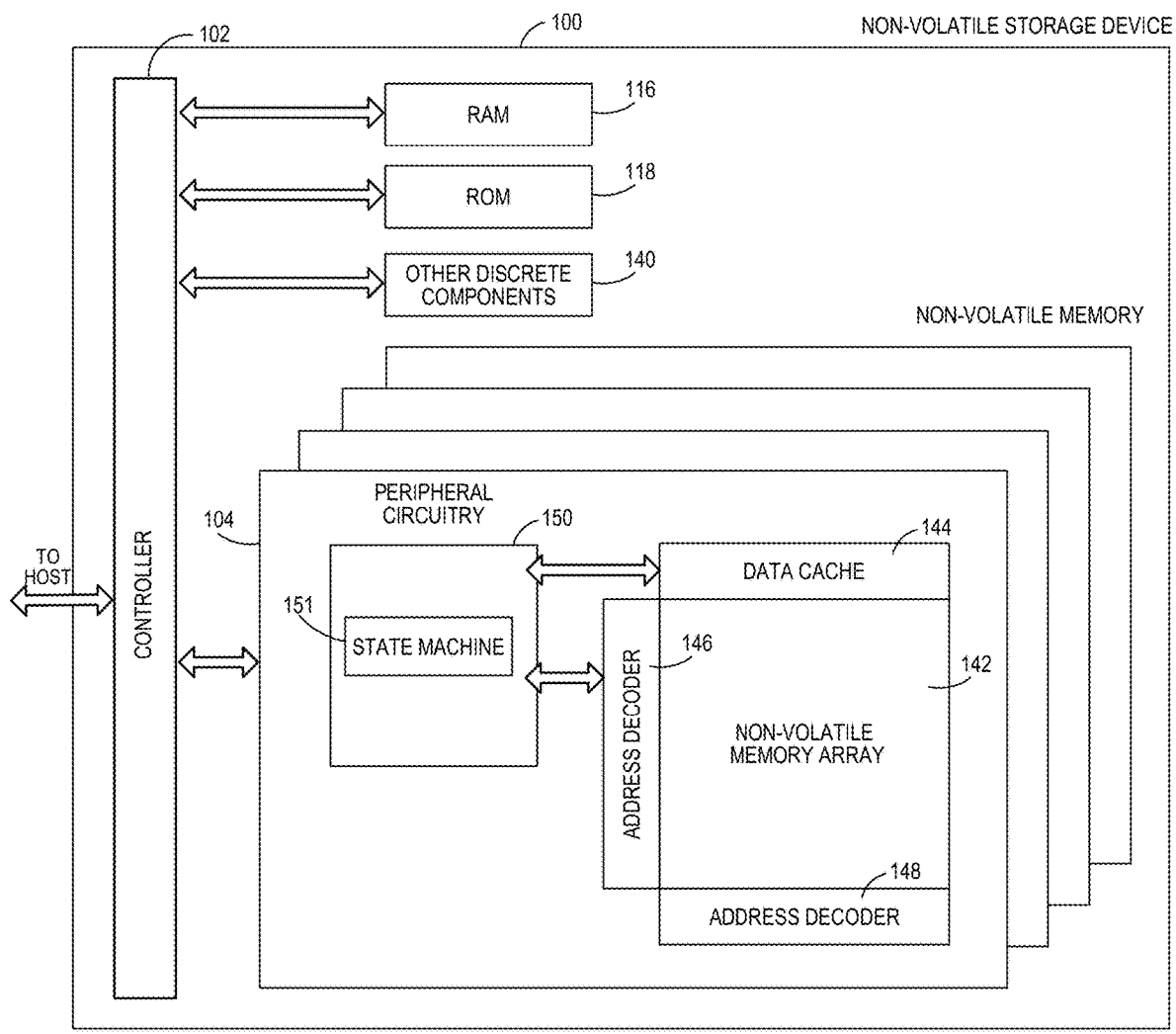
FIG. 2B is a block diagram of exemplary components of a non-volatile memory die of the non-volatile memory system of FIG. 1A.

FIG. 2B is a block diagram illustrating exemplary components of a non-volatile memory die 104 in more detail. The non-volatile memory die 104 may include a non-volatile memory array 142. The non-volatile memory array 142 may include a plurality of non-volatile memory elements or cells, each configured to store one or more bits of data. The non-volatile memory elements or cells may be any suitable non-volatile memory cells, including NAND flash memory cells and/or NOR flash memory cells in a two dimensional and/or three dimensional configuration. The memory cells may take the form of solid-state (e.g., flash) memory cells and can be one-time programmable, few-time programmable, or many-time programmable. In addition, the memory elements or cells may be configured as single-level cells (SLCs) that store a single bit of data per cell, multi-level cells (MLCs) that store multiple bits of data per cell, or combinations thereof. For some example configurations, the multi-level cells (MLCs) may include triple-level cells (TLCs) that store three bits of data per cell.

Additionally, a flash memory cell may include in the array 142 a floating gate transistor (FGT) that has a floating gate and a control gate. The floating gate is surrounded by an insulator or insulating material that helps retain charge in the floating gate. The presence or absence of charges inside the floating gate may cause a shift in a threshold voltage of the FGT, which is used to distinguish logic levels. That is, each FGT's threshold voltage may be indicative of the data stored in the memory cell. Hereafter, FGT, memory element and memory cell may be used interchangeably to refer to the same physical entity.

The memory cells may be disposed in the memory array 142 in accordance with a matrix-like structure of rows and columns of memory cells. At the intersection of a row and a column is a FGT (or memory cell). A column of FGTs may be referred to as a string. FGTs in a string or column may be electrically connected in series. A row of FGTs may be referred to as a page. Control gates of FGTs in a page or row may be electrically connected together.

The memory array 142 may also include wordlines and bitlines connected to the FGTs. Each page of FGTs is coupled to a wordline. In particular, each wordline may be coupled to the control gates of FGTs in a page. In addition, each string of FGTs may be coupled to a bitline. Further, a single string may span across multiple wordlines, and the number of FGTs in a string may be equal to the number of pages in a block.

The non-volatile memory die 104 may further include a page buffer or data cache 144 that caches data that is sensed from and/or that is to be programmed to the memory array 142. The non-volatile memory die 104 may also include a row address decoder 146 and a column address decoder 148. The row address decoder 146 may decode a row address and select a particular wordline in the memory array 142 when reading or writing data to/from the memory cells in the memory array 142. The column address decoder 148 may decode a column address to select a particular group of bitlines in the memory array 142 to be electrically coupled to the data cache 144.

In addition, the non-volatile memory die 104 may include peripheral circuitry 150. The peripheral circuitry 150 may include a state machine 151 that provides status information to the controller 102. Other functionality of the state machine 151 is described in further detail below.

As discussed above, NVMe is a standard for accessing non-volatile storage media attached via PCI Express (PCIe) bus. In that regard, FIG. 3 is used to illustrate a sequence of steps for executing a command via the NVMe standard. The NVMe standard discloses a scalable host controller interface designed to address the needs of Enterprise and Client systems that utilize PCI Express-based solid state drives. Such systems are based on a paired submission queue and completion queue mechanism.

As shown in FIG. 3, the host device 300 includes host memory 302, and the memory device includes a controller, such as an NVMe controller 310. In the implementation illustrated in FIG. 3, the host memory 302 includes a submission queue 304 and a completion queue 306. Further, in one implementation, the submission queues and completion queues may have a 1:1 correlation. Alternatively, the submission queues and completion queues do not have a 1:1 correlation.

In practice, at the initialization phase, the host device 300 may instruct the memory device to create the submission queue(s) and corresponding completion queue(s) in a memory resident in the memory device, such as a controller memory buffer. Alternatively, the submission queue(s) and corresponding completion queue(s) may be resident in the host device 300.

The submission queue 304 and completion queue 306 may be based on a ring buffer, with a head pointer and a tail pointer. In one implementation, the submission queue and completion queue are circular buffers with fixed slot sizes, such as 64 Bytes for submission queues and 16 Bytes for completion queues. For example, a host device may have up to 64K outstanding commands to a submission queue.

After the submission queue(s) are created, the host device 300 may write a command (or several commands) to the submission queue. This is indicated in FIG. 3 as step 1, labeled "Queue Command". In particular, FIG. 3 illustrates that four commands were written to the submission queue. In step 2, the host device 300 writes to a submission queue tail doorbell register 312 in the memory device. This writing to the submission queue tail doorbell register 312 signifies to the memory device that the host device has queued one or more commands in this specific submission queue 304 (e.g., 4 commands as illustrated in FIG. 3). After which, the memory device writes the command to the submission queue.

In the general case, there may be several submission queues (with potentially many pending commands in the several submission queues). Thus, before performing step 3, the memory device controller may arbitrate between the various submission queues to select the particular submission queue from which to fetch the command(s). In this regard, the memory device may consider a single submission queue, alone, in deciding whether to fetch commands from that single submission queue. Alternatively, the memory device may consider multiple submission queues, in combination, in deciding whether to fetch commands from the multiple submission queues.

Responsive to determining which particular submission queue 304 from which to fetch the command(s), at step 3, the memory device fetches the command(s) from the particular submission queue 304. In practice, the memory device may use one or more arbitration schemes, such as round-robin, weighted round robin, etc. in order to determine which commands to fetch from the submission queue (s). Discussion of various arbitration schemes are disclosed in U.S. patent application Ser. No. 15/585,717, incorporated by reference herein in its entirety. Further, the memory device may access the base address of the particular submission queue 304 plus the pointer on the current head pointer implemented in the host device 300.

At step 4, the memory device processes the command. In one implementation, the memory device parses the commands, and determines the steps to execute the commands (e.g., read/write/etc.). For example, the command may comprise a read command. In the NVMe base specification, responsive to receipt of the read command, the memory device parses the read command, implements the address translation, and accesses the flash to receive the data. After receiving the data, the memory device may perform error correction on the data accessed from flash. Thereafter, the memory device may cause the error-corrected data to be stored on the host device based on information in the command (e.g., the PRP1 discussed below). In particular, the PRP1 may define the location (e.g., the address range) of the host command data buffer that resides on the host. As another example, the command may comprise a write command. In the NVMe base specification, responsive to receipt of the write command, the memory device parses the write command, determines the location of the data on the host device subject to the write, reads the data from the location on the host device, and writes the data to flash memory.

After completing the data transfer, at step 5, the memory device controller sends a completion message to the relevant completion queue 306. The completion message may contain information as to the processing of the command(s), such as whether the command was completed successfully or whether there was an error when executing the command.

After step 5, the host device 300 is unaware that the memory device posted to the completion queue 306. This is due to the memory device causing data to be written to the completion queue 306. In that regard, at step 6, the memory device notifies the host device 300 that there has been an update to the completion queue 306. In particular, the memory device posts an interrupt to the host device 300 (e.g., in NVMe, the host device 300 may use an MSI-X interrupt). The interrupt indicates to the host device that there is an entry on the completion queue 306. As discussed in more detail below, in one implementation, the memory device may use the host command data buffer until the memory device notifies the host device at step 6 that there has been an update to the completion queue 306.

Responsive to receiving the interrupt, the host device 300 determines that there are one or more completion entries pending for the host device 300 in this completion queue 306. At step 7, the host device 300 then processes the entries in the completion queue 306.

After the host processes the entries from the completion queue 306, at step 8, the host device 300 notifies the memory device of the entries that the host device 300 processed from the completion queue 306. This may be performed by updating a completion queue head doorbell register 314 indicative to the memory device that the host device 300 processed one or more entries from the completion queue 306.

Responsive to updating the completion queue head doorbell register 314, the memory device updates the head of the completion queue 306. Given the new head, the memory device is aware as to which entries in the completion queue 306 have already been processed by the host device 300 and may be overwritten.

Figure 4:
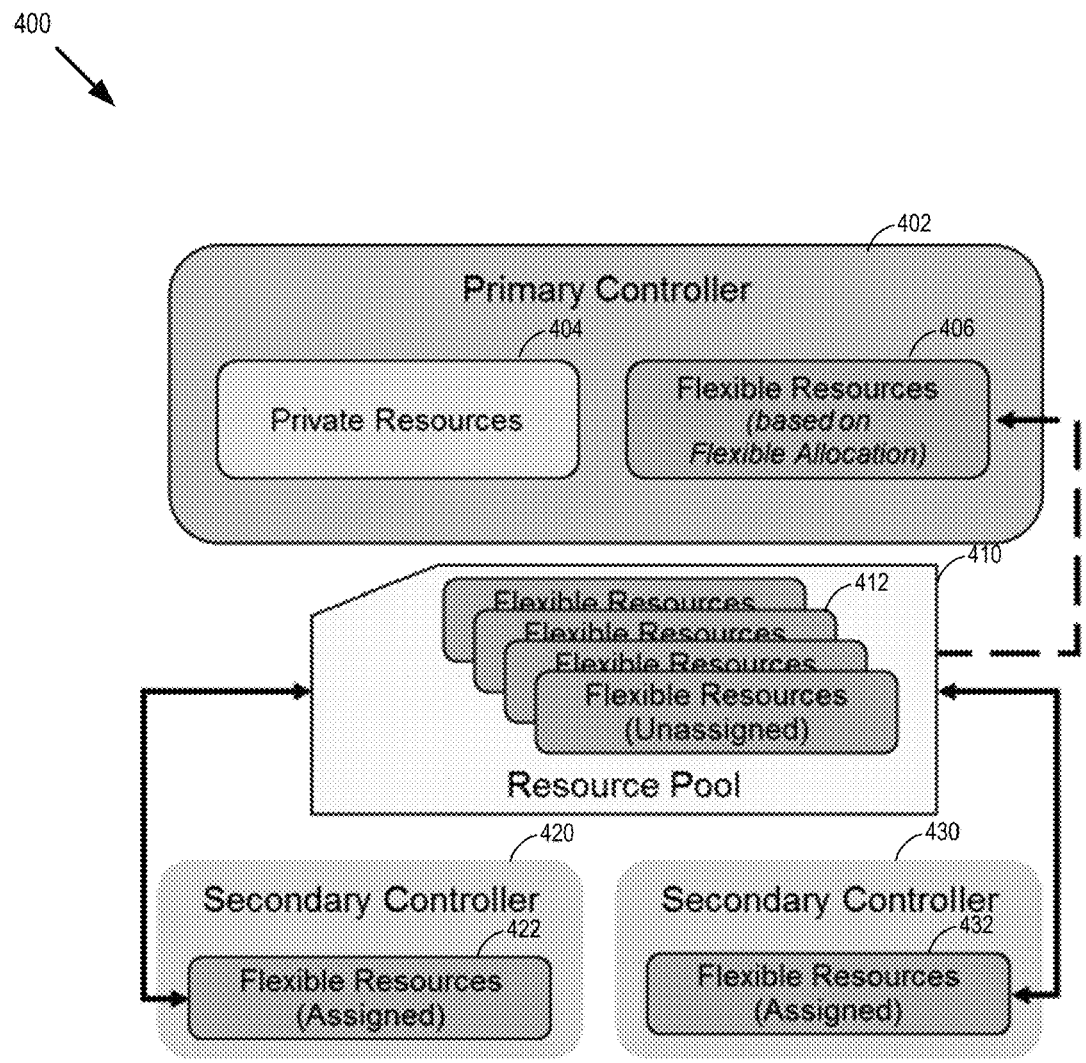
FIG. 4 is a block diagram of primary and secondary controllers.

FIG. 4 is a block diagram 400 of a primary controller 402 and secondary controllers 420, 430. The primary controller 402 may include various resources, such as private resources 404 and flexible resources 406. Private resources 404 comprise resources whose allocation is not flexible and are pre-determined to be allocated to the primary controller 402. Flexible resources 406 comprise resources that may be allocated to a controller, such as primary controller 402.

In practice, a resource pool 410 comprises one or more unassigned flexible resources 412. The host device may assign the unassigned flexible resources 412 to the primary controller 402, or to a secondary controller, such as secondary controller 420 or 430. Thus, after assignment, secondary controller 420 may have assigned flexible resource 422, and secondary controller 430 may have assigned flexible resource 432.

Figure 5:
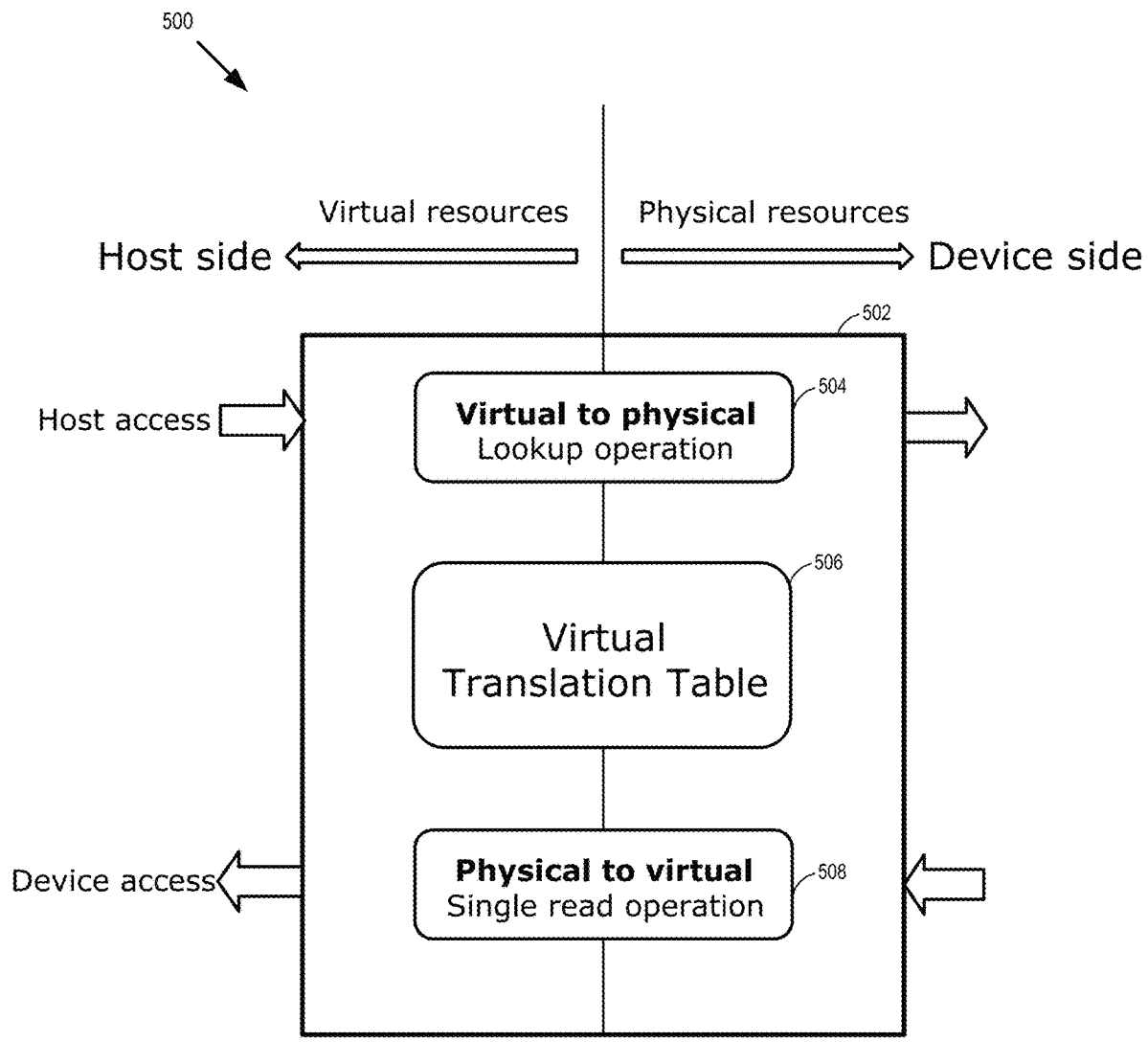
FIG. 5 is a block diagram illustrating the translation between the virtual world and the physical world using the virtual translation table.

FIG. 5 is a block diagram 500 illustrating the translation between the virtual world and the physical world using the virtual translation table 506. As discussed above, the host device, represented by the host side, works with virtual resources whereas the memory device, represented by the device side, works with physical resources. A host access, originating from the host side, is input to block 502. For example, when the host accesses either the doorbell registers or the MSI-X table, the memory device implements a virtual to physical lookup operation 504 with the virtual translation table 506 in order to find an entry in the table that holds the virtual function ID and virtual resource ID. Based on the virtual to physical lookup operation 504, the appropriate physical resource ID is selected. Conversely, when the transaction is initiated by the memory device, the opposite translation is performed (e.g., physical to virtual translation). In particular, the memory device implements a physical to virtual lookup operation 508 with the virtual translation table 506 in order to find an entry in the table that holds the physical resource ID. Based on the physical to virtual lookup operation 508, the appropriate virtual function ID and virtual resource ID are selected. For this scenario, a single read operation from this table may be performed.

Figure 8:
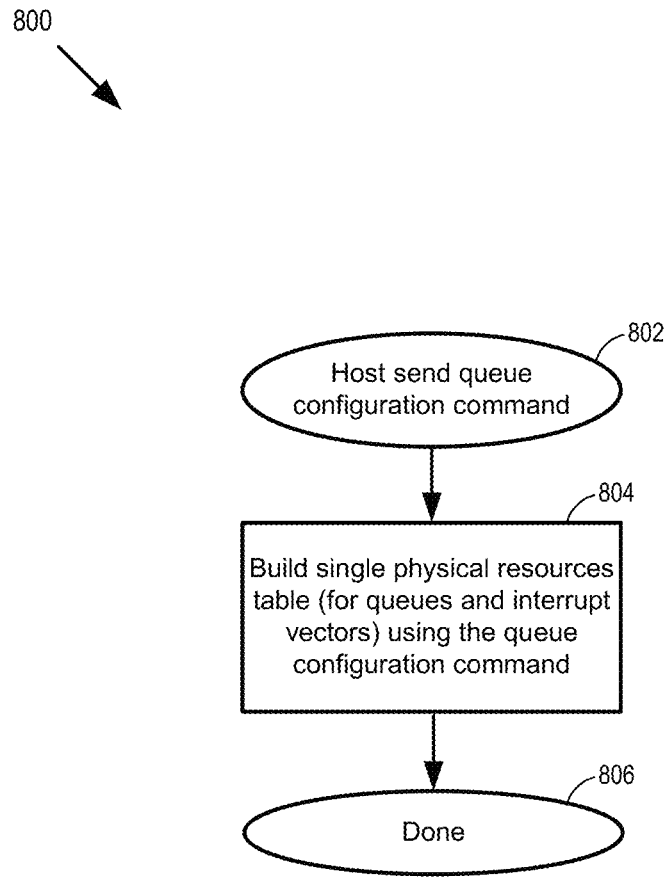
FIG. 8 is a flow chart for building the single table (such as illustrated in FIG. 7A).

FIG. 8 is a flow chart 800 for building the single physical resources table (such as illustrated in FIGS. 7A-C). At 802, the host sends a configuration command, such as a queue configuration command. Based on the host sending a command regarding a single resource, the memory device may populate the single physical resources table. In particular, at 804, the memory device may build the single physical resources table for multiple physical resources (such as for queues and interrupt vectors) using the queue configuration command (e.g., using a single queue configuration command). After which, at 806, the flow chart 800 is done. In this regard, even though the memory device may receive multiple configuration commands (such as a first configuration command (e.g., directed to the queues) and a second configuration command (e.g., directed to the interrupt vectors)), the memory device may build the single physical resources table based on the first configuration command (e.g., directed to the queues) without reliance on the second configuration command (e.g., directed to the interrupt vectors).

Figure 9:
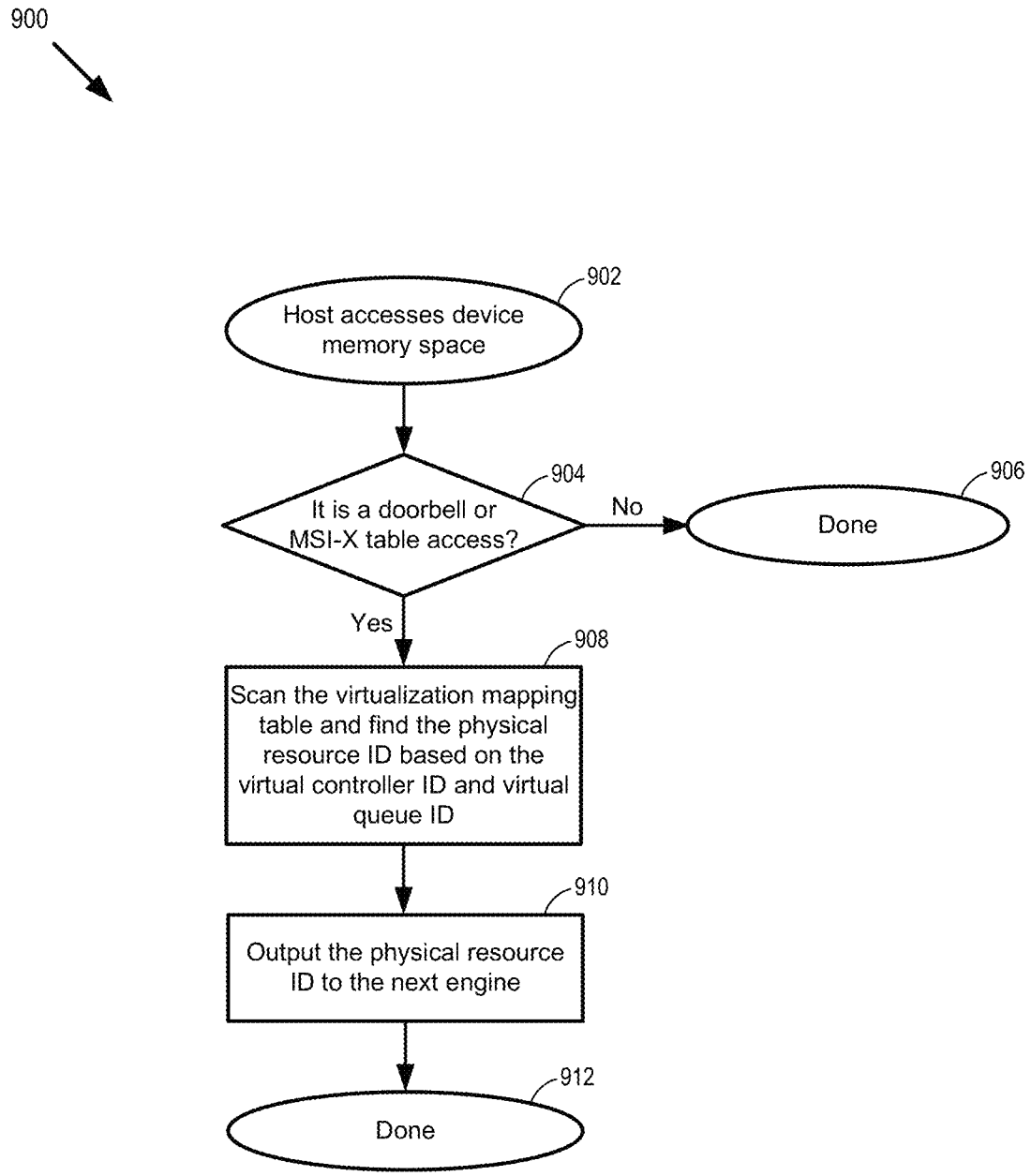
FIG. 9 is a flow chart for performing the translation from the virtual world to the physical world using the single virtual translation table.

FIG. 9 is a flow chart 900 for performing the translation from the virtual world to the physical world using the single virtual translation table. At 902, the memory device may receive a host access. At 904, the memory device determines whether the host access is a doorbell or a MSI-X table access. As discussed above with regard to FIG. 3, the host may send a doorbell at step 2 to notify of an entry in the submission queue. Further, the host may seek to access the MSI-X table responsive to the interrupt. If the host access is not related to a doorbell or MSI-X table access, flow chart 900 is done at 906. Otherwise, a virtual-to-physical resource ID translation is implemented. In particular, at 908, the memory device scans the virtual translation table in order to locate the appropriate physical resource ID that is correlated to the relevant virtual function ID along with the virtual resource ID. At 910, the physical resource ID is then output to the next engine for use. After which, the flow chart 900 is done at 912. In this way, the memory device, which operates in the physical world, may use the physical resource ID rather than the virtual one.

Figure 10:
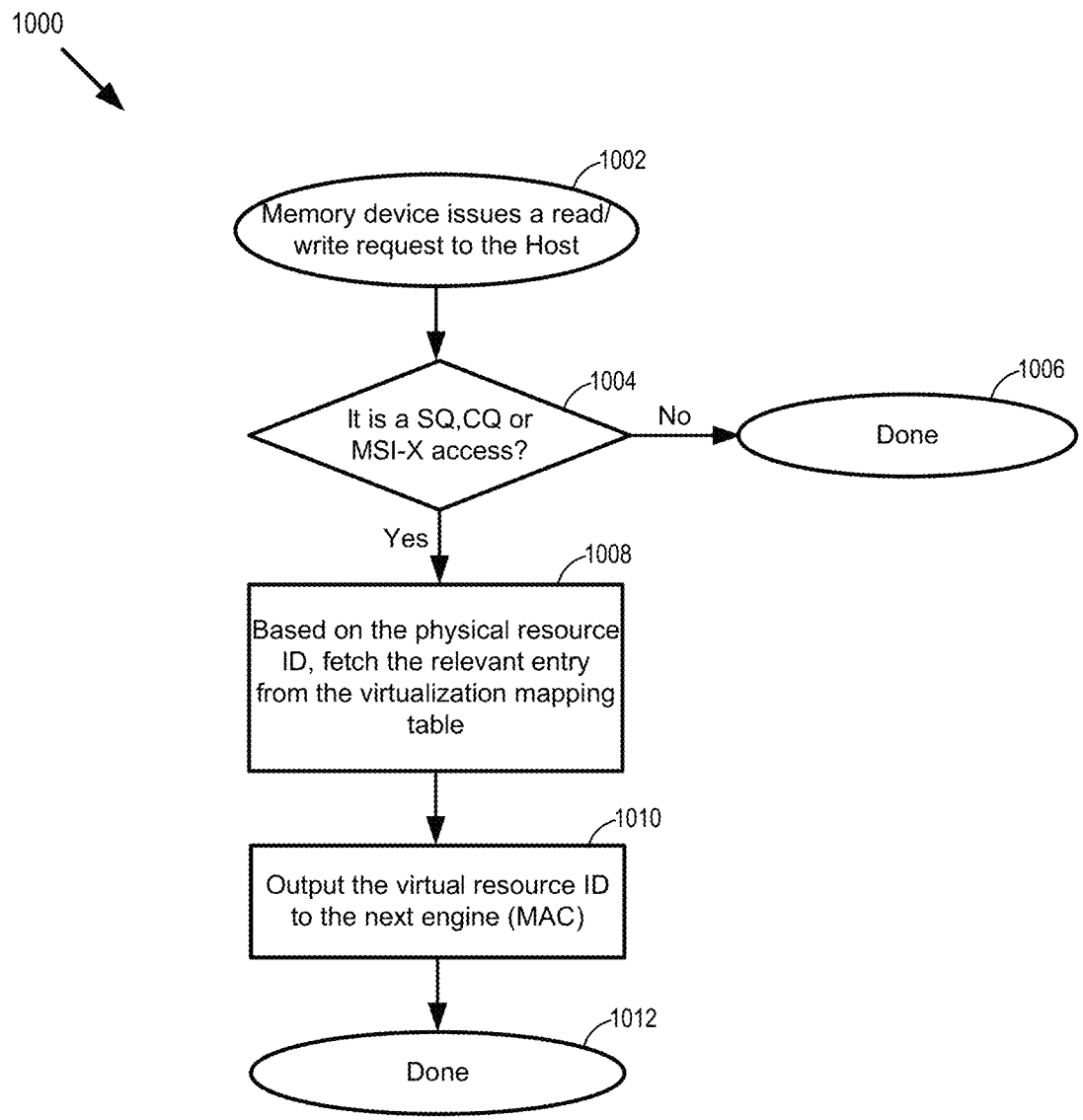
FIG. 10 is a flow chart for performing the translation from the physical world to the virtual world using the single virtual translation table.

FIG. 10 is a flow chart 1000 for performing the translation from the physical world to the virtual world using the single virtual translation table. At 1002, the memory device issues a read/write request to the host. At 1004, the memory device determines whether the read/write request is a submission queue, completion queue, or MSI-X access. If the memory access is not related to a submission queue, completion queue, or MSI-X access, flow chart 1000 is done at 1006. Otherwise, a physical-to-virtual resource ID translation is implemented. In particular, at 1008, the memory device fetches the appropriate entry (e.g., the virtual function ID and virtual resource ID) from the virtual translation table based on the physical resource ID. At 1010, the virtual function ID and virtual resource ID is then output to the next engine for use. After which, the flow chart 1000 is done at 1012. In this way, the host, which operates in the virtual world, may use the virtual function ID and virtual resource ID rather than the physical one.

Lastly, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), phase-change memory ("PCM"), or other elements comprising semiconductor or other material capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

The invention claimed is:

1. A method for a memory device to communicate with a host device using a Non-Volatile Memory Express (NVMe) virtualization environment, the method comprising:
in the memory device:
receiving a communication from the host device, the communication comprising one or more virtual identifications (IDs) indicative of the NVMe virtualization environment on the host device;
accessing a single virtual translation table, the single virtual translation table correlating a physical resource identification (ID) with the one or more virtual IDs, wherein the physical resource ID is indicative of both a first physical resource comprising a completion queue and a second physical resource comprising an interrupt vector, wherein the single virtual translation table maps multiple resource types from virtual to physical domains, and vice versa;
using the single virtual translation table to determine the completion queue and the interrupt vector correlated to the one or more virtual IDs, wherein both the completion queue and the interrupt vector are determined from a single table lookup;
and
using the completion queue and the interrupt vector.

2. The method of claim 1, wherein:
the first physical resource comprises a first type of resource;
the second physical resource comprises a second type of resource; and
the first type of resource differs from the second type of resource.

3. The of claim 1, wherein:
the one or more virtual IDs comprise a virtual function ID and a virtual resource ID;
the host device comprises a primary controller and one or more secondary controllers;
the virtual function ID is indicative of the primary controller or one of the one or more secondary controllers.

4. The method of claim 3, further comprising:
in the memory device:
determining to access virtual resources on the host device, the virtual resources correlated to the first physical resource; and
responsive to determining to access the virtual resources:
accessing the single virtual translation table;
using the single virtual translation table to determine the one or more virtual IDs;
generating a device access communication, the device access communication comprising the determined one or more virtual IDs; and
sending the device access communication to the host device.

5. The method of claim 1, further comprising generating, by the memory device, the single virtual translation table.

6. The method of claim 5, wherein generating the single virtual translation table comprises:
receiving a first configuration command from the host device, the first configuration command indicative of configuring the first physical resource, the first configuration command not indicative of configuring the second physical resource;
receiving a second configuration command from the host device, the second configuration command indicative of configuring the second physical resource; and
responsive to receiving the first configuration command and without reliance on the second configuration command, populating the single virtual translation table.

7. The method of claim 1, wherein:
a number of completion queues does not exceed a number of used submission queues; and
a number of interrupt vectors does not exceed the number of completion queues.

8. A memory device comprising:
memory configured to store a virtual translation table, the virtual translation table correlating a physical resource identification (ID) with one or more virtual identifications (IDs), wherein the physical resource ID is indicative of both a first physical resource comprising, a completion queue and a second physical resource comprising an interrupt vector, and wherein the one or more virtual IDs are indicative of a Non-Volatile Memory Express (NVMe) virtualization environment on a host device, wherein the virtual translation table maps multiple resource types from virtual to physical domains, and vice versa;
a communication interface configured to communicate with the host device; and
a controller in communication with the memory and the communication interface, the controller configured to:
receive, via the communication interface from the host device, a host device access request, the host device access request comprising the one or more virtual IDs;
access the virtual translation table to determine the completion queue and the interrupt vector correlated to the one or more virtual IDs in the host device access request, wherein both the completion queue and the interrupt vector are determined from a single table lookup; and
use the completion queue and the interrupt vector.

9. The memory device of claim 8, wherein:
the one or more virtual IDs comprise a virtual function ID and a virtual resource ID;
the host device comprises a primary controller and one or more secondary controllers;
the virtual function ID is indicative of the primary controller or one of the one or more secondary controllers.

10. The memory device of claim 9, wherein the controller is further configured to:
determine to access virtual resources on the host device, the virtual resources correlated to the first physical resource; and
responsive to determining to access the virtual resources:
access the virtual translation table;
use the virtual translation table to determine the one or more virtual IDs;
generate a memory device access communication, the memory device access communication comprising the determined one or more virtual IDs; and
send, via the communication interface, the memory device access communication to the host device.

11. The memory device of claim 8, wherein the controller is further configured to generate the virtual translation table by:
- receiving a first configuration command from the host device, the first configuration command indicative of configuring the first physical resource, the first configuration command not indicative of configuring the second physical resource;
- receiving a second configuration command from the host device, the second configuration command indicative of configuring the second physical resource; and
- responsive to receiving the first configuration command and without reliance on the second configuration command, populating the virtual translation table.

12. The memory device of claim 8, wherein:
- a number of completion queues does not exceed a number of used submission queues; and
- a number of interrupt vectors does not exceed the number of completion queues.

13. A method for populating a virtual translation table for a memory device to communicate with a host via Non-Volatile Memory Express (NVMe), the method comprising:
in the memory device:
- receiving a first configuration command from the host, the first configuration command indicative of configuring a first physical resource comprising a completion queue, the first configuration command not indicative of configuring a second physical resource comprising an interrupt vector;
- receiving a second configuration command from the host, the second configuration command indicative of configuring the second physical resource;
- responsive to receiving the first configuration command and without reliance on the second configuration command, populating a single virtual translation table, the single virtual translation table configured for translation between virtual resources and the first and second physical resources, wherein the single virtual translation table maps multiple resource types from virtual to physical domains, and vice versa; and
- using the single virtual translation table to translate between the virtual resources and the first and second physical resources, wherein both the completion queue and the interrupt vector are determined from a single table lookup.

14. The method of claim 13, wherein:
the first physical resource comprises a first type of resource;
the second physical resource comprises a second type of resource; and
the first type of resource differs from the second type of resource.

15. The method of claim 13, wherein:
the single virtual translation table correlates a physical resource identification (ID) with one or more virtual identifications (IDs); and
the physical resource ID is indicative of both the first physical resource and the second physical resource.

16. The method of claim 15, wherein:
the one or more virtual IDs comprise a virtual function ID and a virtual resource ID;
the host comprises a primary controller and one or more secondary controllers; and
the virtual function ID is indicative of the primary controller or one of the one or more secondary controllers.

17. The method of claim 13, wherein:
the second configuration command is indicative of using a first part of the second physical resource and not using a second part of the second physical resource; and
populating the single virtual translation table comprises populating the single virtual translation table so that the single virtual translation table is indicative that both the first part and the second part of the second physical resource are used.

18. The method of claim 13, wherein:
a number of completion queues does not exceed a number of used submission queues; and
a number of interrupt vectors does not exceed the number of completion queues.

19. A non-volatile memory device comprising:
memory configured to store a virtual translation table, the virtual translation table correlating a physical resource identification (ID) with one or more virtual identifications (IDs), wherein the physical resource ID is indicative of both a first physical resource comprising a completion queue and a second physical resource comprising an interrupt vector, wherein the one or more virtual IDs are indicative of a Non-Volatile Memory Express (NVMe) virtualization environment on a host device, and wherein the virtual translation table maps multiple resource types from virtual to physical domains, and vice versa;
a communication interface configured to communicate with the host device; means for receiving, via the communication interface from the host device, a host device access request, the host device access request comprising the one or more virtual IDs;
means for accessing the virtual translation table to determine the physical resource ID correlated to the one or more virtual IDs, wherein both the completion queue and the interrupt vector are determined from a single table lookup; and
means for using the completion queue and the interrupt vector to execute the host device access request.

20. The non-volatile memory device of claim 19, further comprising:
means for receiving a first configuration command from the host device, the first configuration command indicative of configuring the first physical resource, the first configuration command not indicative of configuring the second physical resource;
means for receiving a second configuration command from the host device, second configuration command indicative of configuring the second physical resource; and
means for, responsive to receiving the first configuration command and without reliance on the second configuration command, populating the virtual translation table.

21. The non-volatile memory device of claim 19, wherein:
a number of completion queues does not exceed a number of used submission queues; and
a number of interrupt vectors does not exceed the number of completion queues.

* * * * *